C. E. BROWN.
LIQUID FUEL BURNER.
APPLICATION FILED MAR. 23, 1910.
1,057,032.
Patented Mar. 25, 1913.
2 SHEETS—SHEET 2.
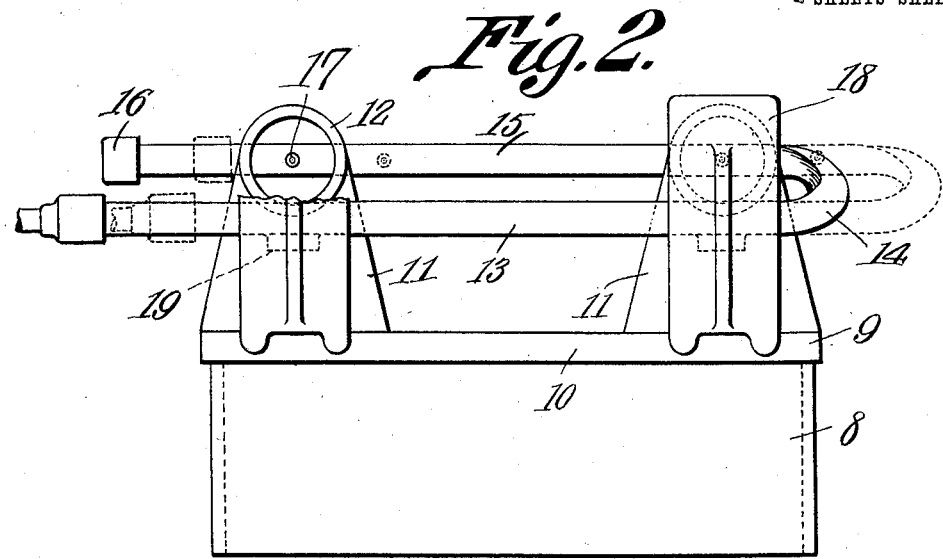
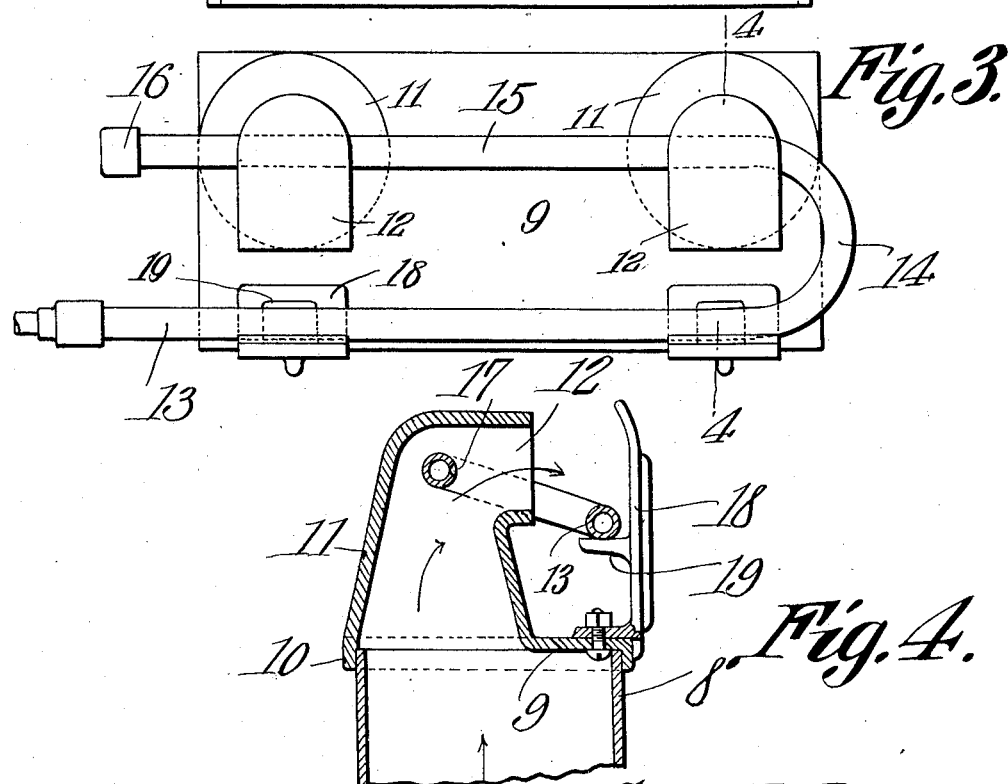

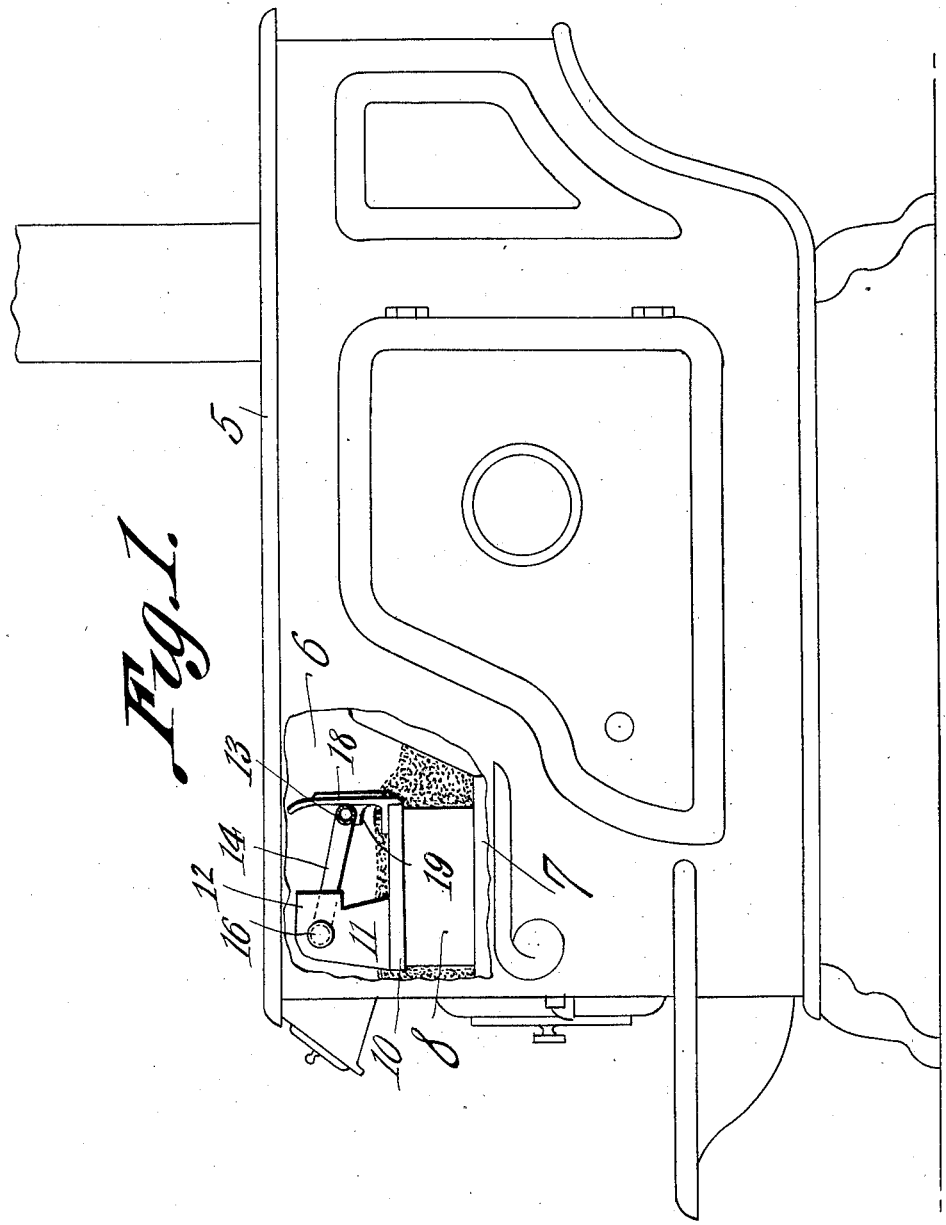

UNITED STATES PATENT OFFICE.

CARL ERNEST BROWN, OF COLUMBUS, OHIO, ASSIGNOR TO MARK A. DAY, OF ST. PAUL, MINNESOTA.

LIQUID-FUEL BURNER.

1,057,032.   Specification of Letters Patent.   Patented Mar. 25, 1913.

Application filed March 23, 1910. Serial No. 551,097.

*To all whom it may concern:*

Be it known that I, CARL E. BROWN, a citizen of the United States, residing at Columbus, in the county of Franklin and State of Ohio, have invented a new and useful Liquid-Fuel Burner, of which the following is a specification.

This invention relates to that class of liquid fuel burners which are designed more particularly to be applied to cooking stoves by being placed in the fire pot thereof.

It is the object of the present invention to provide a burner of the kind stated which is simple in construction, and highly efficient in operation, and also one which can be applied to any ordinary cooking stove without altering or modifying the structure thereof.

Another object of the invention is to provide a burner which can be easily controlled, and also to provide improved means for vaporizing the fuel, and mixing air with the vapor, in such a manner as to produce an exceedingly hot flame.

With these objects in view, the invention consists in a novel construction and arrangement of parts to be hereinafter described and claimed, reference being had to the accompanying drawings forming a part of this specification, in which drawings, Figure 1 is an elevation of a stove, partly broken away, showing the burner in position within the fire pot. Fig. 2 is a front elevation of the burner removed from the stove. Fig. 3 is a plan view. Fig. 4 is a transverse section on the line 4—4 of Fig. 3.

In the drawings, the numeral 5 denotes an ordinary cooking stove, the fire pot of which is denoted at 6, and the grate at 7. On the grate is supported an air chamber 8 comprising a rectangular casing which is open at the top and bottom. This casing supports the burner, the latter having a flat base portion 9 seating on the upper end of the casing, and entirely closing said end. The burner base has a depending marginal flange 10 which exteriorly surrounds the upper portion of the casing, and serves to hold the burner in position thereon. From the burner base rise air tubes or conduits 11 which are tapered in the direction of their upper ends, and also have said ends extending sidewise, so that the air will be discharged laterally. The drawings show a burner provided with two of these air tubes, but it will be obvious that the number of such tubes is immaterial, and may be varied according to the size of the burner. The laterally extending discharge ends of the air tubes are indicated at 12.

At 13 is indicated the fuel pipe, said pipe entering the fire pot of the stove at any convenient point and extending in a straight line from one end of the base 9 to the other, a suitable distance above the same. The pipe has a return bend 14 from which it extends parallel to the first described portion as indicated at 15, the end of said portion 15 being closed by a cap 16, and said portion also passing through the air tubes 11, and having outlet apertures 17. The portion 15 of the fuel pipe is so located in the air tubes, that the apertures 17 discharge centrally through the laterally extending portions 12 of the air tubes.

In front of the outlet ends of the air tubes are located flame spreaders 18 comprising flat plates secured to the base 9 and rising therefrom a sufficient distance to extend in front of the outlet ends of the air tubes, the upper ends of said plates being curved forwardly slightly in the direction of the air tubes. The flame spreader plates 18 are formed with shelves 19 which support the fuel pipe 13. Said pipe is slidably mounted on said shelves for a purpose to be presently described. The flame spreaders are spaced a sufficient distance from the outlet ends of the air tubes so as not to interfere with the free discharge of the air and vapor therefrom. That portion of the fuel pipe which is supported on the shelves 19, is located below the level of the portion 15 of said pipe.

The burner herein described is mounted in the fire pot of the stove by placing it on top of the casing 8, and positioning the latter on the grate 7. A hole will be drilled in one of the end walls of the stove to admit the fuel pipe, said pipe leading to a tank or other source of supply which will be suitably elevated to give a gravity feed. The space in the fire box around the casing 8 will be filled with ashes, so that no air can pass to the burner except through the casing 8 and the tubes 11, this air entering the casing through the grate bars. A thin layer of ashes also covers the base 9 of the burner.

In operation, to start the burner, the fuel pipe is pushed inwardly until the apertures 17 are on the outside of the air tubes 11 as shown by dotted lines in Fig. 2. The fuel is then turned on, and a small quantity is allowed to run on the ashes covering the burner base 9, after which the fuel is shut off and the saturated ashes ignited. The burning fuel quickly heats that portion of the pipe 13 which extends across the burner base in front of the air tubes, and when said pipe gets hot enough to generate vapor, it is pulled outwardly to bring the apertures 17 back into the air tubes. The fuel is then again turned on, and in passing through the hot pipe is vaporized, and issues in this form from the apertures 17, the jet of vapor being discharged from the laterally extending portions 12 of the air tubes, and becoming lighted from the flame which still comes from the fuel in the ashes. The jets of vapor as they pass through the air tubes are mixed with air, and a highly combustible gas is produced which makes an exceedingly hot flame filling the entire fire pot, the flames being spread by the plates 18. In view of the close proximity of the fuel pipe to the air tubes, said pipe remains hot as long as the burner is in operation, and the vaporization of the fuel thus continues uninterruptedly.

The burner is economical in its consumption of fuel, and there is no waste when starting the same. All the fuel dropping on the ashes is consumed. The fuel remains in the fire pot and cannot drip down into the ash box of the stove, whereby smoke is entirely eliminated upon starting the burner.

The burner is simple and durable in construction, and also can be easily installed, no specially constructed stove being required.

What is claimed is:

1. A liquid fuel burner comprising a base, upwardly and laterally extending open ended conduits arising therefrom, a fuel pipe extending in front of the outlet ends of said conduits and having a portion extending through said conduits, said portion having outlet apertures in line with the outlets of said conduits, said fuel pipe being adjustable to bring the aperture thereof outside of the air conduits.

2. A liquid fuel burner comprising a base, a casing on which the base is supported, said casing being open at the top and bottom and adapted to be supported on the grate of a stove, upwardly and laterally extending open ended conduits arising from said base, a fuel pipe extending in front of the outlet ends of said conduits and having a portion extending through said conduits, said portion having outlet apertures in line with the outlets of the conduits.

3. A liquid fuel burner comprising a base, air conduits rising therefrom and opening therethrough, said conduits having laterally extending outlet ends, and a fuel pipe extending in front of the outlet ends of the air conduits and having a portion extending through said conduits, said portion having outlet apertures in line with the outlets of the conduits, and flame spreaders located in front of the outlet ends of the air conduits.

4. A liquid fuel burner comprising a base, air conduits rising therefrom and opening therethrough, said conduits having laterally extending outlet ends, flame spreaders located in front of said outlet ends, shelves on the flame spreaders, and a fuel pipe supported on the shelves and having a portion extending through the air conduits, said portion having outlet apertures in line with the outlets of said conduits.

5. In combination with a fire box, a burner comprising a base suitably supported upon the fire box grating, hoods supported upon said base and opening therethrough, said hoods being formed with side outlets, a tube longitudinally slidable through said hoods and formed with burner jets, and means for connecting said tube with a source of fuel supply.

6. In combination with a fire box, a burner comprising a base supported upon the fire box grating, a hood supported upon said base provided with an inlet opening therethrough, said hood being formed with an outlet at its upper end, tubing longitudinally slidable through said hood, and means for connecting said tubing with a source of fuel supply.

7. In combination with a fire box formed with a bottom grating, a burner comprising a base supported upon said grating, a hood supported upon said base and provided with an inlet opening therethrough, said hood being formed with an outlet at its upper end, a tube longitudinally slidable through said hood and formed with a burner jet, a tube connected to said first mentioned tube extending longitudinally through said fire box alongside said hood, and means for connecting said last mentioned tube with a source of fuel supply.

8. In combination with a fire box formed with a bottom grating, a burner comprising a base removably supported upon said grating, hoods supported upon said base, said hoods being formed with inlet openings through said base and with an outlet at its upper end, a tube longitudinally slidable through said hoods formed with burner jets, means connecting said tube with a source of liquid fuel supply, and spreader plates positioned in front of the outlet openings in said hoods.

In testimony that I claim the foregoing as my own, I have hereto affixed my signature in the presence of two witnesses.

CARL ERNEST BROWN.

Witnesses:
A. W. GRANT,
T. C. PITSENBERGER.